(12) United States Patent
Chuang et al.

(10) Patent No.: US 7,817,260 B2
(45) Date of Patent: Oct. 19, 2010

(54) BEAM DELIVERY SYSTEM FOR LASER DARK-FIELD ILLUMINATION IN A CATADIOPTRIC OPTICAL SYSTEM

(75) Inventors: Yung-Ho Chuang, Cupertino, CA (US); J. Joseph Armstrong, Milpitas, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 83 days.

(21) Appl. No.: 12/074,405

(22) Filed: Mar. 3, 2008

(65) Prior Publication Data

US 2008/0225282 A1 Sep. 18, 2008

Related U.S. Application Data

(63) Continuation of application No. 11/171,079, filed on Jun. 30, 2005, now Pat. No. 7,345,825.

(51) Int. Cl.
*G01N 21/00* (2006.01)
(52) U.S. Cl. ................... 356/237.1; 356/237.2
(58) Field of Classification Search ... 356/237.1–237.6, 356/369, 124, 128–132, 135–136, 139.07, 356/141.1, 152.2–152.3, 600–601, 612, 445; 359/846–861, 355–368, 725–736, 645–661; 250/201.1–201.3, 306–307, 310, 492.1–494.1
See application file for complete search history.

(56) References Cited

U.S. PATENT DOCUMENTS

| | | |
|---|---|---|
| 4,639,587 A | 1/1987 | Chadwick et al. |
| 5,058,982 A | 10/1991 | Katzir |
| 5,153,668 A | 10/1992 | Katzir et al. |
| 5,177,559 A | 1/1993 | Batchelder et al. |
| 5,428,442 A | 6/1995 | Lin et al. |
| 5,717,518 A | 2/1998 | Shafer et al. |
| 5,790,251 A | 8/1998 | Hagiwara |
| 5,822,055 A | 10/1998 | Tsai et al. |
| 5,999,310 A | 12/1999 | Shafer et al. |
| 6,020,957 A | 2/2000 | Rosengaus et al. |
| 6,064,517 A | 5/2000 | Chuang et al. |
| 6,288,780 B1 | 9/2001 | Fairley et al. |

(Continued)

FOREIGN PATENT DOCUMENTS

WO WO 9949346 A1 9/1999

*Primary Examiner*—Gregory J Toatley, Jr.
*Assistant Examiner*—Tri T Ton
(74) *Attorney, Agent, or Firm*—Smyrski Law Group, A P.C.

(57) ABSTRACT

A method and apparatus for inspecting a specimen are provided. The apparatus comprises a primary illumination source, a catadioptric objective exhibiting central obscuration that directs light energy received from the primary illumination source at a substantially normal angle toward the specimen, and an optical device, such as a prism or reflective surface, positioned within the central obscuration resulting from the catadioptric objective for receiving further illumination from a secondary illumination source and diverting the further illumination to the specimen. The method comprises illuminating a surface of the specimen at a variety of angles using a primary illumination source, illuminating the surface using a secondary illumination source, the illuminating by the secondary illumination source occurring at a substantially normal angle of incidence; and imaging all reflected, scattered, and diffracted light energy received from the surface onto a detector.

18 Claims, 9 Drawing Sheets

U.S. PATENT DOCUMENTS

| | | |
|---|---|---|
| 6,560,011 B2 | 5/2003 | Chuang et al. |
| 6,661,580 B1 | 12/2003 | Solarz |
| 6,693,930 B1 | 2/2004 | Chuang et al. |
| 6,801,357 B2 | 10/2004 | Shafer et al. |
| 6,801,358 B2 | 10/2004 | Shafer et al. |
| 6,862,142 B2 | 3/2005 | Lange |
| 2001/0000679 A1 | 5/2001 | Vaez-Iravani et al. |
| 2003/0002147 A1 | 1/2003 | Chuang et al. |
| 2005/0052643 A1 | 3/2005 | Lange et al. |

BEAM DELIVERY SYSTEM FOR LASER DARK-FIELD ILLUMINATION IN A CATADIOPTRIC OPTICAL SYSTEM

This application is a continuation of U.S. patent application Ser. No. 11/171,079, filed Jun. 30, 2005 now U.S. Pat. No. 7,345,825, entitled "Beam Delivery System for Laser Dark-Field Illumination in a Catadioptric Optical System," inventors Yung-Ho Chuang, et al., the entirety of which is incorporated herein by reference.

BACKGROUND OF THE INVENTION

1. Field of the Invention

The present invention relates generally to the field of optical imaging, and more specifically to catadioptric optical systems used for bright-field and dark-field optical inspection applications.

2. Description of the Related Art

Many optical and electronic systems exist to inspect surface features for defects such as those on a partially fabricated integrated circuit or a reticle. Defects may take the form of particles randomly localized on the surface, scratches, process variations such as under etching, and so forth. Such techniques and apparatus are well known in the art and are embodied in various commercial products such as many of those available from KLA-Tencor Corporation of San Jose, Calif.

Several different imaging modes exist for optical inspection. These include bright-field, and a variety of dark-field imaging modes. Each of these imaging modes can detect different types of defects. An ideal inspection machine would combine several different modes into a single system. This could reduce inspection costs as well as provide performance advantages. However, this is very difficult to do in practice because different imaging modes have different optical design, software, and system requirements. In general, systems that attempt to combine bright-field and dark-field imaging do not perform either mode as well as single-mode designs.

Bright-field imaging is commonly used in lamp based microscope systems. The advantage of bright-field imaging is the imaged features are typically readily distinguishable. Image feature size accurately represents the size of object features multiplied by the magnification of the optical system. Dark-field imaging is successfully used to detect features on objects. The advantage of dark-field imaging is that flat specular areas scatter very little light toward the detector, resulting in a dark image. Any surface anomalies or features protruding above the object scatter light toward the detector. Thus, in inspecting objects such as semiconductor wafers, dark-field imaging produces an image of features, particles, or other irregularities on a dark background. Normal incidence laser dark-field is a flexible imaging mode that is suited for detecting microscratches.

Examples of inspection systems include high numerical aperture (NA) catadioptric systems with central obscurations, such as those shown in U.S. Pat. No. 5,717,518 by Shafer et al., and U.S. Pat. No. 6,064,517 by Chuang et al. Bright field and dark field imaging is employed in, for example, U.S. Pat. No. 6,288,780 by Fairley et al., U.S. Pat. No. 5,153,668 by Katzir et al., and U.S. Pat. No. 5,058,982 by Katzir. Fourier filtering in laser dark field imaging has been employed in certain designs, such as those shown in U.S. Pat. No. 5,177,559 by Batchelder et al. and U.S. Pat. No. 5,428,442 by Lin et al.

Certain of the previous designs exhibit beam delivery issues when performing dark-field imaging. For example, high NA systems can have dark-field illumination capabilities limited by the central obscuration in the catadioptric optical design. In these systems dark-field illumination can be limited to angles greater than a certain value, such as five degrees. Off axis dark-field imaging and low NA bright-field imaging has been employed to address this angular illumination issue in catadioptric designs. In such a design, the dark-field illumination may be a high NA annular illumination scheme where bright-field illumination and imaging may be limited to those NAs that can pass through a hole in the center of the focusing mirror element. Such a construction can also limit dark-field illumination and collection angles. Another prior apparatus for combining bright-field and dark-field into one design uses off axis dark-field and low NA bright-field imaging. The dark-field illumination is a high NA linear type of illumination. The bright-field illumination and imaging is again limited to those NAs that can pass through a slot in the center of the focusing mirror elements, again limiting dark-field illumination and collection angles.

One prior method for achieving Fourier filtering with laser dark-field imaging uses a collimated beam of monochromatic light to illuminate a semiconductor wafer from outside the objective between an angle of 82 degrees from the normal and the NA defined by the imaging objective. Before forming a dark field image, the collected light passes through a Fourier filter to attenuate the spatial frequency components corresponding to repeating array patterns. This laser directional dark-field method illuminates the wafer outside the NA of the imaging objective. For this reason, the illumination angles can be limited to between 82 degrees from the normal and the NA defined by the imaging objective. Collection angles are also limited to the range of angles within the NA of the objective. A long working distance objective is necessary to allow access by the laser to the area of interest on the semiconductor wafer. Objectives used in dark field applications of this type are generally limited to NAs less than 0.7, which corresponding to collection angles of only up to 44 degrees from normal. A major drawback of this approach is the Fourier distribution collected by the optics is highly directional, where only higher angles are collected from one side of the scattered and diffracted light distribution.

Another prior method for achieving Fourier filtering with laser dark-field imaging uses a collimated beam of monochromatic light illuminating the wafer from inside the optical system within the NA defined by the objective. If the system encounters a specific range of defect sizes, the illumination angle on the wafer is chosen so the optical system collects those spatial frequencies of interest. This is a laser directional dark-field method wherein the laser illuminates the wafer from inside the NA as defined by the objective. The problem with this technique is that small amounts of scattered and reflected light from lens elements in this design have the ability to produce noise at levels that compromise sensitivity. Introducing laser illumination near the pupil location in the imaging system can cause a significant amount of back-scattered and reflected light from the multiple lens surfaces traversed by the illuminating light. The system must also deal with forward-scattered light from the specularly reflected component from the wafer, a significant potential problem. Another problem with this technique is that the system uses the same objective pupil plane for injecting the illumination and processing the light collected by the objective. This objective pupil feature limits the usable types of illumination and Fourier filtering. Achieving a higher NA is also difficult using this design. Higher NA lenses generally require more optical elements, further increasing scattering noise.

In general, it can be difficult to offer both bright-field and dark-field imaging in a high NA inspection system while offering Fourier filtering, operation over a desirable range of wavelengths, and dark-field illumination over a desirable range of angles.

It would therefore be beneficial to provide a system that delivers a beam of laser dark-field illumination that overcomes the foregoing drawbacks present in previously known imaging systems. Further, it would be beneficial to provide an optical inspection system design having improved functionality over devices exhibiting the negative aspects described herein.

SUMMARY OF THE INVENTION

According to one aspect of the present design, there is provided an apparatus for inspecting a specimen. The apparatus comprises a primary illumination source, a catadioptric objective exhibiting a central obscuration that accepts light energy received from the primary illumination source and delivers light energy at angles substantially greater than normal toward the specimen. Substantially greater than normal represents angles substantially greater than approximately zero degrees. The apparatus further comprises an optical device positioned within the central obscuration resulting from the catadioptric objective for receiving further illumination from a secondary illumination source and diverting the further illumination at near normal incidence to the specimen.

According to another aspect of the present design, there is provided a method for inspecting a specimen. The method comprises illuminating a surface of the specimen at a variety of angles using a primary illumination source, illuminating the surface using a secondary illumination source, the illuminating by the secondary illumination source occurring at a substantially normal angle of incidence; and imaging all reflected, scattered, and diffracted light energy received from the surface onto a detector.

These and other advantages of the present invention will become apparent to those skilled in the art from the following detailed description of the invention and the accompanying drawings.

DESCRIPTION OF THE DRAWINGS

The present invention is illustrated by way of example, and not by way of limitation, in the figures of the accompanying drawings in which.

DETAILED DESCRIPTION OF THE INVENTION

The present design is an apparatus that can support both broad-band bright-field inspection and laser dark-field inspection techniques without compromising the performance of either technique. To accomplish this enhanced dual-mode inspection capability, both inspection techniques use the same imaging system, detection system, and autofocus system. The illumination systems employed differ from those previously available, and a Fourier filter or other pupil aperture is employed for normal incidence laser dark-field modes. A detector with a suitable dynamic range may be employed in the detection system to handle the high dynamic range signals produced by the normal incidence dark-field inspection technique.

The present design is useful for beam delivery for illuminating surfaces for optical inspection with laser sources. The design is particularly suited for use with optical systems that have a central obscuration which blocks light from traversing along the optical axis of the imaging system. One embodiment of the invention allows the laser light to enter into the objective using, in part, components located substantially within the central obscuration region. This light is then redirected along the optical axis of the objective. This normal incidence illumination technique results in dark-field imaging when the components are aligned such that the specular reflection from the inspected surface is reflected back along the illumination path and is not collected by the imaging system. Both the illuminating light and the specularly reflected light pass only a few objective lens surfaces so that scattering noise from the optics is reduced. Other embodiments allow off-axis illumination in a similar manor.

The normal-incidence dark-field illumination path may use a relatively small mirror or prism component selectively positioned to direct the light entering the imaging system from the side to a path along the optical axis and normal to the surface. The mirror or prism component may be mounted directly onto an existing optical element in the system, mounted onto the central obscuration component, or mounted on a support structure that is also substantially within the obscuration region. If the component is made to fill the central obscuration, then unwanted reflection and scattering can be further reduced. Off axis illumination is also possible using a similar design.

The components of the beam delivery system for laser dark-field illumination do not impact other forms of illumination or imaging such as broad-band bright-field illumination and imaging. Therefore dark-field illumination and inspection may function independently of bright-field illumination. The configuration also allows for simultaneous operation of different illumination and imaging techniques. For example, conventional broad-band bright-field using lamp based illumination may operate simultaneously with laser illumination. The final image may then contain both light sources. The balance of light between these sources can be controlled to optimize the inspection performance. Alternatively, the final image may be separated using wavelength-selective elements into, for example, a bright field lamp image and a dark field laser image. Separate optical or electronic processing and detection can then be employed for each image.

The present designs are well suited for use with Fourier filtering techniques. In addition, laser Fourier filtering techniques can be used simultaneously with broad-band bright-field imaging.

Figure 1:
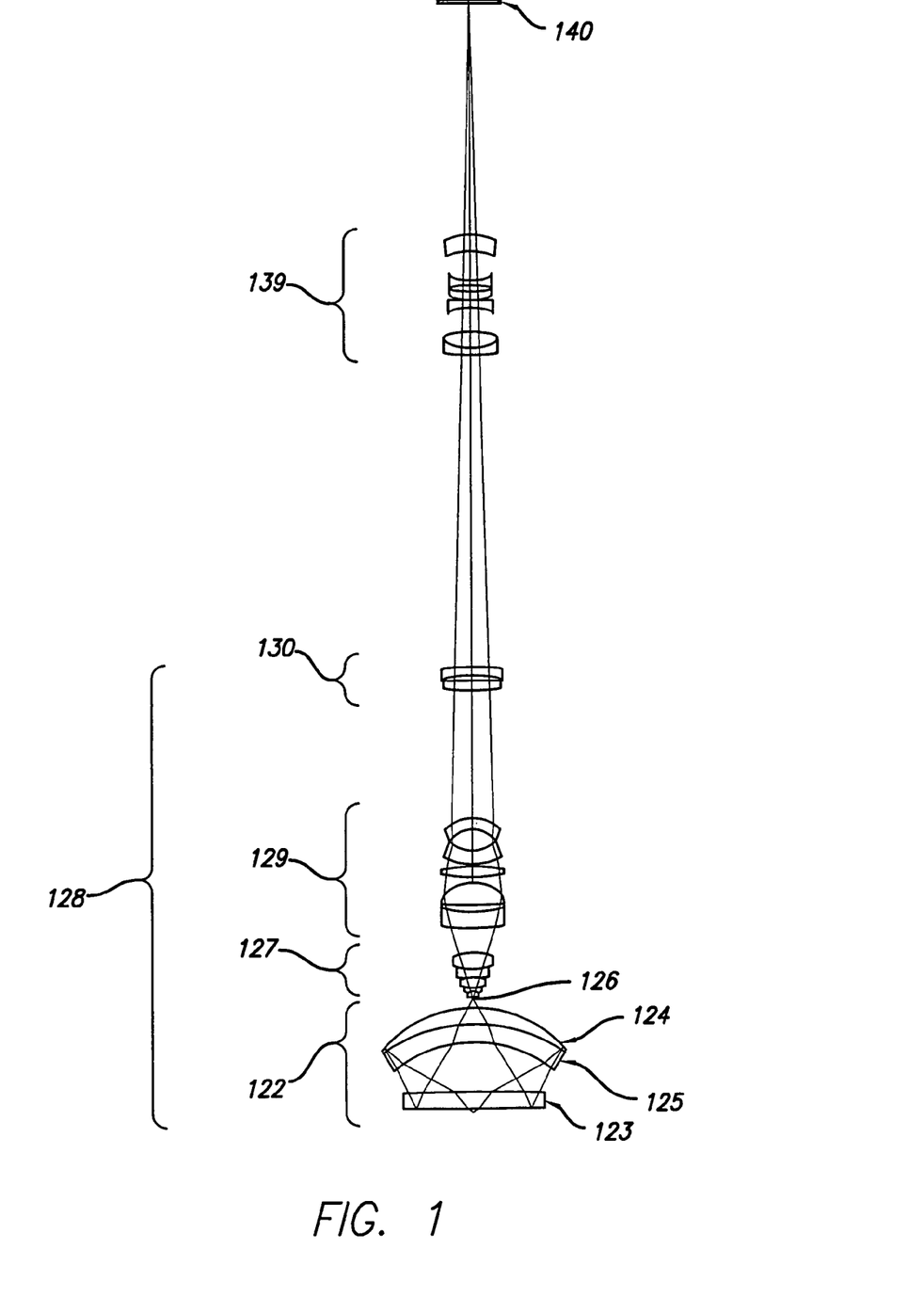
FIG. 1 is a prior art broad-band catadioptric imaging system suitable for use in the present design.

One embodiment of an imaging system suitable for use with this embodiment is shown in FIG. 1. The design of FIG. 1 is a catadioptric imaging system described in U.S. Pat. No. 5,999,310, entitled "ULTRA-BROAD-BAND UV MICROSCOPE IMAGING SYSTEM WITH WIDE RANGE ZOOM CAPABILITY," filed on Aug. 7, 1997, which is a continuation in part of U.S. Pat. No. 5,717,518, entitled "BROAD SPECTRUM ULTRA VIOLET CATADIOPTRIC IMAGING SYSTEM" filed on Jul. 22, 1996, both of which are assigned to KLA-Tencor Corporation and both of which are hereby incorporated by reference.

Figure 4:
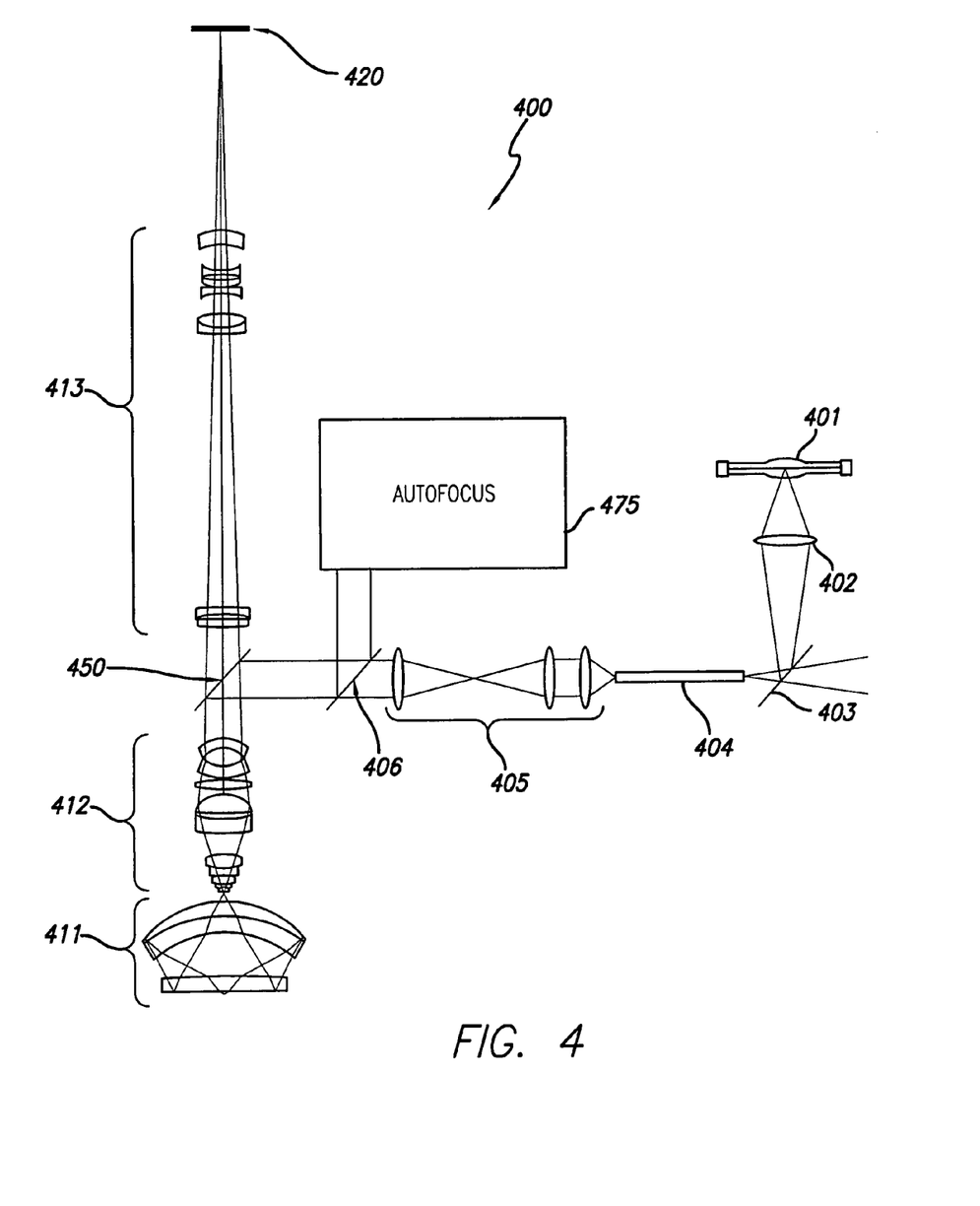
FIG. 4 represents a Broad-band catadioptric imaging system with lamp-based bright field illumination and autofocus system in accordance with the present design.

The design of FIG. 1, similar to the design of FIG. 4 of the '310 patent, comprises a catadioptric objective section 128 and a zooming tube lens group sections 139. The catadioptric objective section 128 comprises a catadioptric lens group 122, a field lens group 127, and a focusing lens group 129. The system images an object (not shown), such as a semiconductor wafer, to the image plane or detector array 140. The complete 0.9 NA catadioptric objective section 128 is also described in the '518 patent.

The catadioptric objective section 128 is optimized for ultra-broadband imaging in the UV spectral region (about 0.20 to 0.40 micron wavelength). The design uses the Schupmann principle in combination with an Offner field lens to correct for axial color and first order lateral color, and an achromatized field lens group to correct the higher order lateral color. The catadioptric lens group 122 includes a near planar or planar reflector 123, which is a reflectively coated lens element, a meniscus lens 125, and a concave spherical reflector. This design uses a concave reflector 124 and a large meniscus lens 125 to simplify manufacturing. Both reflective elements have central optical apertures without reflective material to allow light from the intermediate image plane 126 to pass through the concave reflector, be reflected by the near planar (or planar) reflector 123 onto the concave reflector 124, and pass back through the near planar (or planar) reflector 123, traversing the associated lens element or elements on the way.

The achromatic multi-element field lens group 127 may be made from two or more different refractive materials, such as fused silica and fluoride glass, or diffractive surfaces. The field lens group 127 may be optically coupled together or alternatively may be spaced slightly apart in air. Because fused silica and fluoride glass do not differ substantially in dispersion in the deep ultraviolet range, the individual powers of the several component element of the field lens group need to be of relatively high magnitude. Use of such an achromatic field lens allows the complete correction of axial color and lateral color over an ultra-broad spectral range. In the simplest version of the design, only one field lens component need be of a refractive material different than the other lenses of the system. The field lens group 127 is moved slightly from the intermediate image location to decrease the heat load and surface scattering of the field lens group 127.

The design of FIG. 1 has a focusing lens group 129 with multiple lens elements, preferably all formed from a single type of material, with refractive surfaces having curvatures and positions selected to correct both monochromatic aberrations and chromatic variation of aberrations and focus light to an intermediate image. In the focusing lens group 129 a special combination of lenses 130 with low power corrects the system for chromatic variation in spherical aberration, coma, and astigmatism.

Design features of the field lens group 127 and the low power group 130 provide significant optical advantages. The zooming tube lens system 139 combined with the catadioptric objective 128 can allow the detector array 140 to be stationary during zooming, although the design is not limited to the components and orientation shown. For example, assuming that the catadioptric objective system 128 does not also have any zooming function, two general design possibilities may be available for zooming tube lens system or zooming section 139.

First, the zooming section 139 can be all the same refractive material, such as fused silica, and can be designed so that primary longitudinal color and primary lateral color do not change during zooming. Primary chromatic aberrations do not have to be corrected to zero, and typically cannot be corrected to zero if only one glass type is used, but they generally have to be stationary. Then the design of the catadioptric objective 128 can be modified to compensate for these uncorrected but stationary chromatic aberrations of the zooming tube lens. The combined microscope system shown in FIG. 1 may be constructed from a single material, i.e., fused silica, except for the calcium fluoride or a diffractive surface in the achromatized Offner-type field lens.

Second, the zooming tube lens group 139 can be corrected for aberrations independently of the catadioptric objective 128. Such a construction can require at least two refractive materials with different dispersions, such as fused silica and calcium fluoride, or diffractive surfaces. The result may be a tube lens system that, because of unavoidable higher-order residuals of longitudinal and lateral color over the entire zoom range, is generally not capable of high performance over a very broad UV spectral region. Compromises can be made in reducing the spectral range, the numerical aperture, the field size of the combined system, or some combination of these compromises.

The design of FIG. 1 straddles the two situations just described. The zooming tube lens 139 may first be corrected independently of the catadioptric objective 128, using two refractive materials (such as fused silica and calcium fluoride). Zooming tube lens 139 may then be combined with the catadioptric objective 128. The catadioptric objective can be modified to compensate for the residual higher-order chromatic aberrations of the zooming tube lens system, an effect achievable due to the design of the field lens group 127 and the low power lens group 130 of the catadioptric objective. The combined system can then be optimized with all parameters being varied to achieve the best performance.

A tube lens section can be designed such that its higher-order chromatic aberrations do not change by any significant amount during zoom. If the detector array 140 is allowed to move during zoom, then the design problem becomes much easier, but that is not nearly as desirable as having an image position fixed relative to the rest of the system.

The imaging system of FIG. 1 is corrected for wavelengths from 230-370 nm, enabling the system to support both broadband bright-field imaging as well as normal incidence laser dark-field imaging at any wavelength within this range. An optical system with a narrower correction range is also possible, but this can limit the lamp bright-field and laser dark-field illumination and imaging wavelengths. The imaging system uses a single moving tube lens group to change the magnification from 38× to 200×. Magnification may be changed by moving the tube lens group and adjusting the optical path to the detector to optimize performance.

Figure 2:
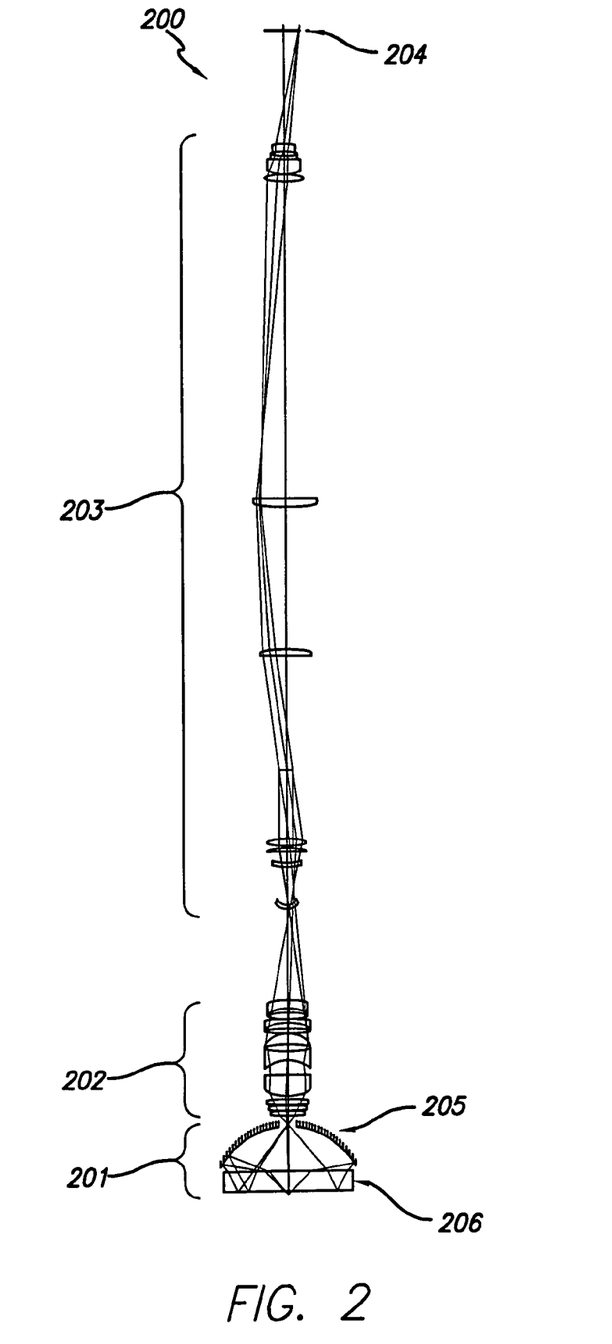
FIG. 2 is a prior art narrow-band alternate catadioptric imaging system also suitable for use in the present design.

An alternate arrangement comprises an apparatus that supports narrow-band bright-field inspection and laser dark-field inspection techniques without compromising the performance of either technique. This system combines laser bright field illumination and normal laser dark field illumination. The bright field laser illumination system may incorporate elements to reduce the laser's apparent temporal and spatial coherence through use of techniques such as a moving optical diffuser element. An imaging system suitable for use with this arrangement is shown in FIG. 2. The design of FIG. 2 contains a catadioptric imaging system 200 optimized for a single wavelength. This type of catadioptric imaging system is extensively discussed in U.S. Pat. No. 6,064,517, titled "HIGH NA SYSTEM FOR MULTIPLE MODE IMAGING," inventors Yung-Ho Chuang et al., issued May 16, 2000, the entirety of which is hereby incorporated by reference.

The prescriptions for the optical components of FIG. 2 are as shown in Table 1.

TABLE 1

Prescriptions for optical components in FIG. 2

| Surf | Radius | Thickness | Material |
|---|---|---|---|
| OBJ | Infinity | 149.014 | |
| 1 | 27.587 | 10.534 | Fused silica |
| 2 | 25.780 | 5.071 | |
| 3 | −20.905 | 3.125 | Fused silica |
| 4 | 132.384 | 2.282 | |
| 5 | −136.513 | 17.944 | Fused silica |
| 6 | −34.990 | 1.010 | |
| 7 | 126.993 | 8.000 | Fused silica |
| 8 | −58.025 | 423.599 | |
| 9 | −1694.877 | 10.000 | Fused silica |
| 10 | −127.963 | 192.592 | |
| 11 | 140.480 | 7.000 | Fused silica |
| 12 | 1002.314 | 152.910 | |
| STO | Infinity | 82.734 | |
| 14 | 72.803 | 7.500 | Fused silica |
| 15 | −72.803 | 2.586 | |
| 16 | 54.855 | 5.500 | Fused silica |
| 17 | Infinity | 13.747 | |
| 18 | −48.455 | 3.000 | Fused silica |
| 19 | −148.848 | 46.133 | |
| 20 | −13.322 | 4.416 | Fused silica |
| 21 | −15.209 | 107.298 | |
| 22 | 121.792 | 10.000 | Fused silica |
| 23 | 46.578 | 5.083 | |
| 24 | 292.207 | 6.500 | Fused silica |
| 25 | −87.559 | 0.100 | |
| 26 | 132.564 | 4.000 | Fused silica |
| 27 | 39.354 | 5.100 | |
| 28 | 182.579 | 7.000 | Fused silica |
| 29 | −113.665 | 0.100 | |
| 30 | 28.442 | 15.931 | Fused silica |
| 31 | 151.603 | 6.997 | |
| 32 | −70.100 | 10.772 | Fused silica |
| 33 | 33.922 | 16.569 | |
| 34 | 270.750 | 24.896 | Fused silica |
| 35 | −34.371 | 6.205 | |
| 36 | 197.516 | 5.500 | Fused silica |
| 37 | −197.516 | 0.100 | |
| 38 | 98.238 | 5.500 | Fused silica |
| 39 | −446.331 | 0.100 | |
| 40 | 52.767 | 5.000 | Fused silica |
| 41 | 319.544 | 15.000 | |
| 42 | Infinity | 52.552 | |
| 43 | Infinity | 23.328 | Fused silica |
| 44 | Infinity | −23.328 | MIRROR |
| 45 | Infinity | −52.552 | |
| 46 | 87.869 | 52.552 | MIRROR |

TABLE 1-continued

Prescriptions for optical components in FIG. 2

| Surf | Radius | Thickness | Material |
|---|---|---|---|
| 47 | Infinity | 23.328 | Fused silica |
| 48 | Infinity | 0.750 | |
| IMA | Infinity | | |

From the foregoing table, as with all other tables including lens prescriptions used herein, "Surf" or similar designation represents the surface number associated with a particular element. Most elements have two surfaces, and thus correlating FIG. 2 with the foregoing table, surface OBJ has an infinite radius of curvature and represents the topmost element in FIG. 2. Surface 1 is the topmost lens surface in the drawing and is 10.534 millimeters from surface OBJ and has a radius of curvature of 27.587 millimeters. The center of surface 2 is 5.071 millimeters from the center of surface 1, and the lens has a thickness of 5.071 millimeters and the lens is formed of fused silica. In this manner, dimensions of every surface in the figures presented can be ascertained.

The broad-band catadioptric imaging system of FIG. 2 is corrected at numerical apertures of up to 0.9, corresponding to illumination and collection angles of up to 64 degrees. The design of FIG. 2 includes various elements broken into groups for the purpose of discussion. Catadioptric group 201 includes mirror element 205 and catadioptric element 206. Field/focusing lens group 202 comprises a plurality of precision lenses. A detector may be positioned at point 204. Precision lensing group 203 includes several additional lenses useful in enabling the high NA and beneficial aspects discussed in the '517 patent in further detail. The catadioptric imaging system 200 has a central obscuration due to the holes in, for example, catadioptric element 205 and flat element 206. In this construction, the optical design has an obscuration of approximately 10 percent of the pupil diameter or 1 percent of the pupil area. Manufacturing tolerances can increase this obscuration to approximately 12 percent of the pupil diameter or approximately 1.4 percent of the pupil area. This obscuration corresponds to a NA of 0.11. Thus, the imaging NA in the design of FIG. 2 is variable from 0.11 to the full 0.9 by using an aperture at the pupil plane.

Regarding "pupil plane," a pupil in an optical system is an image of the aperture stop. At least two pupils and thus two pupil planes are preset in an optical system, one in object space called the entrance pupil or entrance pupil plane and one in image space called the exit pupil or exit pupil plane. As used herein, the term "pupil plane" may mean either the entrance or exit pupil plane depending on the context.

Figure 3:
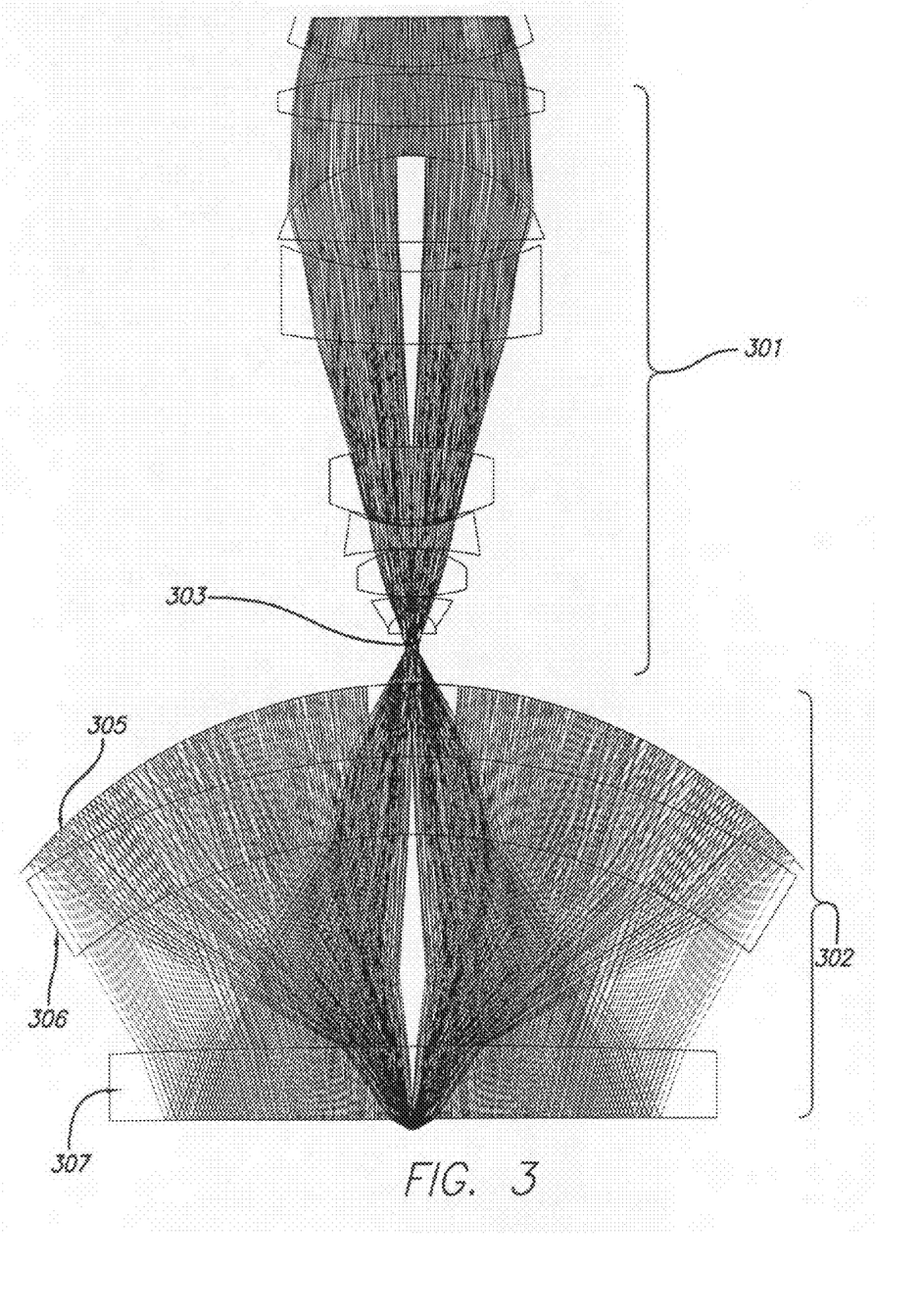
FIG. 3 illustrates ray paths traced through a catadioptric lens with central obscuration, where the central region free of illumination rays is not used for imaging.

The effect of obscuration on the light path in the objective is shown in further detail in FIG. 3, illustrating field/focusing lens group 301, catadioptric group 302, and field point 303. The catadioptric group 301 here comprises reflector 305, curved lens 306, and flat lens/mirror element 307.

The addition of broad-band bright-field illumination and autofocus to the catadioptric imaging system is shown in FIG. 4. Bright-field illumination in this illustration includes a Hg—Xe arc lamp 401, but other light sources may be employed, collection optics 402, cold mirror 403, homogenizer 404, relay optics 405, and an autofocus beam splitter 406. These devices are arranged in a standard microscope illumination scheme. Light may be redirected using beamsplitter/reflective surface 450 to introduce bright-field illumination light into the catadioptric imaging system. FIG. 4 further illustrates catadioptric group 411, focusing lens group 412, and precision lensing group 413, and presents an image plane at point 420, where again a sensor may be positioned. FIG. 4 includes optical components that are identical to those shown in FIG. 1. The prescriptions for the optical components of FIG. 4, specifically those in the primary line of illumination, are as shown in Table 2.

TABLE 2

Figure 5:
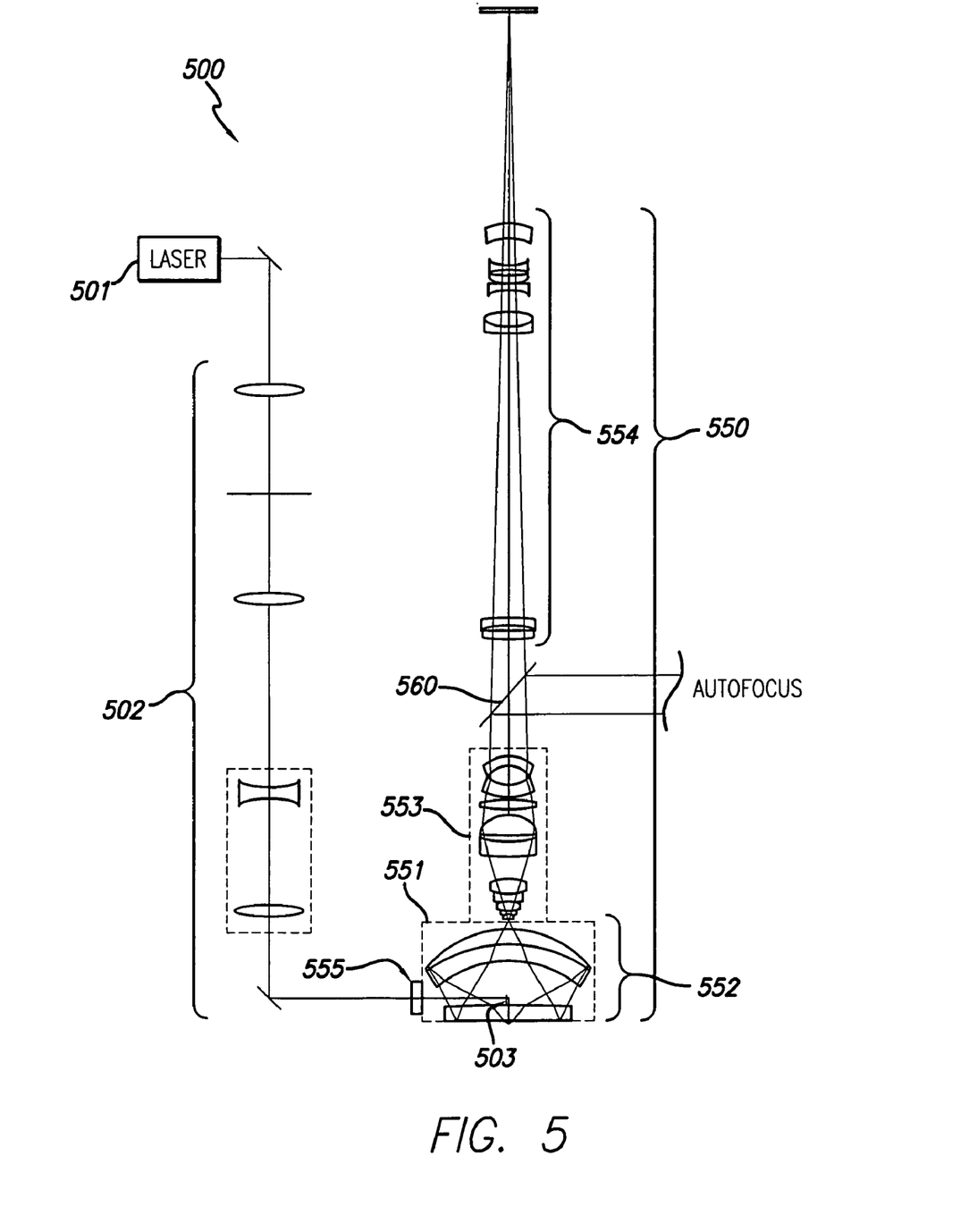
FIG. 5 is a catadioptric imaging system with normal-incidence laser illumination, beam transport optics, and collimator in accordance with the present design.

Prescriptions for optical components in FIGS. 1, 4, and 5

| Surf | Radius | Thickness | Material |
|---|---|---|---|
| OBJ | Infinity | 1.000 | |
| 1 | Infinity | 1.000 | Fused Silica |
| 2 | Infinity | 120.000 | |
| 3 | 40.973 | 9.762 | Fused Silica |
| 4 | 46.979 | 16.920 | |
| 5 | −30.067 | 3.500 | Fused Silica |
| 6 | 86.035 | 3.000 | |
| 7 | −71.814 | 5.500 | Fused Silica |
| 8 | −25.118 | 0.500 | |
| 9 | −127.725 | 4.000 | Calcium Fluoride |
| 10 | 37.602 | 13.711 | |
| 11 | 54.642 | 9.000 | Calcium Fluoride |
| 12 | −30.067 | 0.100 | |
| 13 | −30.290 | 4.500 | Fused Silica |
| 14 | −141.249 | 191.535 | |
| 15 | 137.264 | 4.500 | Fused Silica |
| 16 | 58.294 | 2.750 | |
| 17 | 275.840 | 6.000 | Fused Silica |
| 18 | −87.851 | 76.110 | |
| 19 | 30.726 | 6.000 | Fused Silica |
| 20 | 19.670 | 12.102 | |
| 21 | −25.298 | 7.455 | Fused Silica |
| 22 | −48.347 | 1.000 | |
| 23 | 79.720 | 7.000 | Fused Silica |
| 24 | −93.732 | 4.000 | |
| STO | 24.234 | 12.000 | Fused Silica |
| 26 | −453.150 | 4.121 | |
| 27 | −50.118 | 10.000 | Fused Silica |
| 28 | −127.725 | 14.254 | |
| 29 | 42.780 | 10.000 | Fused Silica |
| 30 | −33.255 | 0.960 | |
| 31 | −20.242 | 3.000 | Fused Silica |
| 32 | 50.846 | 0.100 | |
| 33 | 13.926 | 6.607 | Calcium Fluoride |
| 34 | −34.229 | 0.100 | |
| 35 | 33.741 | 2.000 | Fused Silica |
| 36 | 3.813 | 0.020 | |
| 37 | 3.813 | 3.000 | Calcium Fluoride |
| 38 | 70.287 | 7.000 | |
| 39 | Infinity | 10.023 | |
| 40 | 99.998 | 11.000 | Fused Silica |
| 41 | 80.583 | 29.230 | |
| 42 | 1021.400 | 10.000 | Fused Silica |
| 43 | Infinity | −10.000 | MIRROR |
| 44 | 1021.400 | −29.230 | |
| 45 | 80.583 | −11.000 | Fused Silica |
| 46 | 99.998 | −10.023 | |
| 47 | 74.989 | 10.023 | MIRROR |
| 48 | 99.998 | 11.000 | Fused Silica |
| 49 | 80.583 | 29.230 | |
| 50 | 1021.400 | 10.000 | Fused Silica |
| 51 | Infinity | 1.500 | |
| IMA | Infinity | | |

Various autofocus systems can be used to control the focus position of the specimen or sample surface. The autofocus mechanism 475 is illustrated in FIG. 4. One autofocus technique is described in U.S. Pat. No. 4,639,587 entitled "AUTOMATIC FOCUSING SYSTEM FOR A MICROSCOPE" filed on Jan. 22, 1985 which is hereby incorporated by reference. This type of autofocus operates at a different wavelength than the illumination and can be introduced using a dichroic mirror, shown as the reflective surface 450 in FIG. 4. This mirror can be placed in the illumination system.

The addition of a normal incidence laser dark-field illumination to the catadioptric imaging system is shown in FIG. 5. The dark-field illumination includes a UV laser 501, adaptation optics 502, an aperture and window 555 in the mechanical housing 551, and a prism 503 to redirect the laser along the optical axis at normal incidence to the surface. The prism 503 also directs the specular reflection from specimen surface features and reflections from the optical surfaces out of the objective 550 along the path of the illumination laser. Again, lensing is provided in the general form of a catadioptric group 552, focusing/field group 553, and precision lensing group 554.

Many different laser sources are available within the 230-370 nm wavelength band supported by the catadioptric imaging system 500. For example, continuous wave (CW) or pulsed lasers at wavelengths of 363.8, 354, 351, 333, 325, 275, 266, 257, 248, 244 nm, and so forth, can be used. For many applications a CW laser may be useful for inspection. A CW laser can eliminate timing problems between the laser and data acquisition. Adaptation optics can be used to control the illumination beam size and profile on the surface being inspected, and the prism element may also provide illumination control. An optional zoom system can change the illumination beam size to match the field size when imaging magnifications change. Such a zoom system can minimize the laser energy required to inspect at small field sizes.

Figure 6:
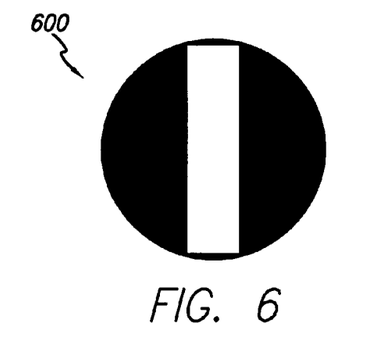
FIG. 6 is a detailed view of a field aperture placed at a field plane to limit illumination light.
Figure 7:
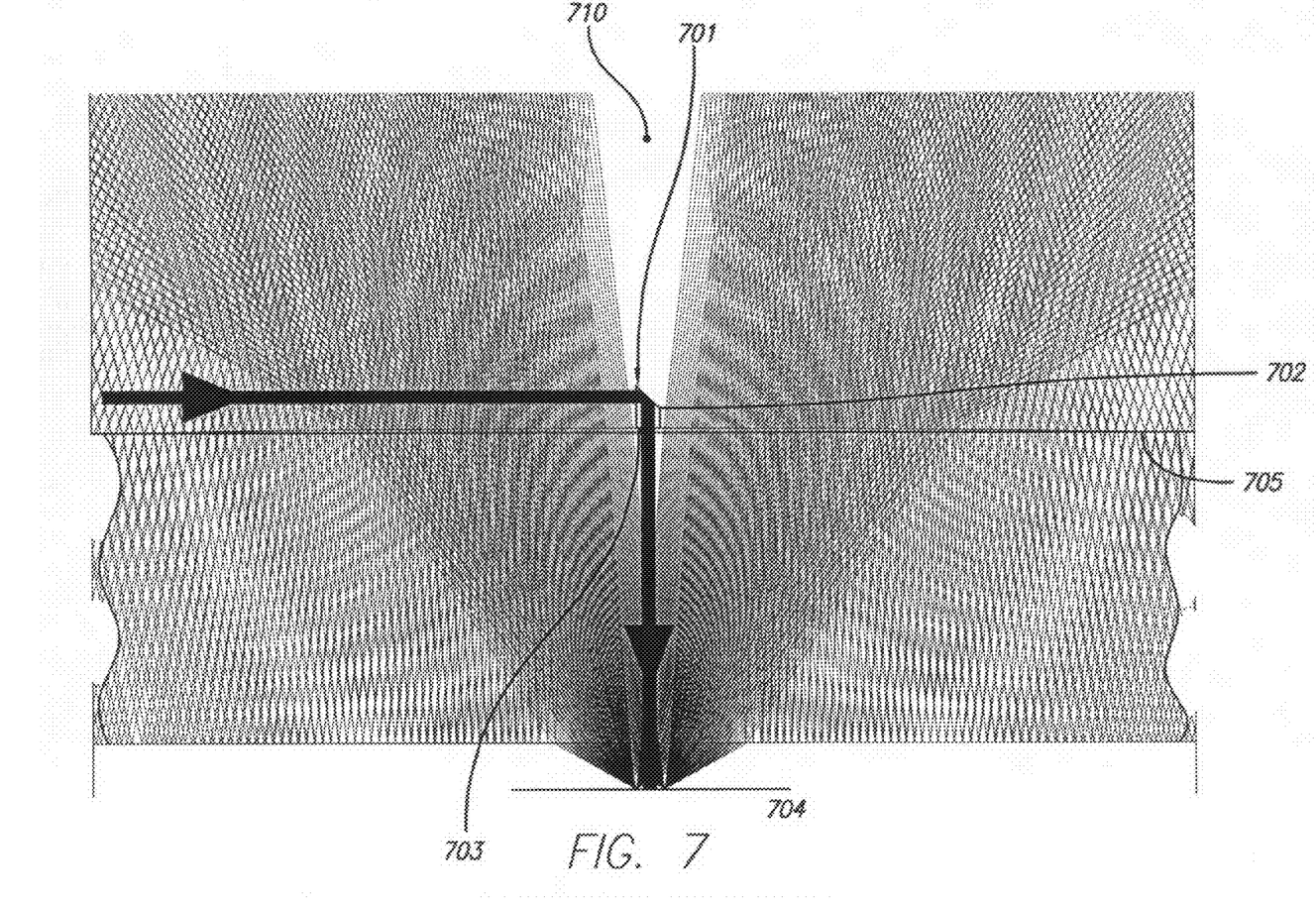
FIG. 7 represents a prism beam turning configuration located within the shadow of the central obscuration.

A field aperture 600 as shown in FIG. 6 may also be used to limit unwanted scattering light from entering the system. The field aperture can optionally be imaged to the surface being inspected using additional optics. The polarization of the illumination can be chosen to optimize the signal-to-noise ratio for defects of interest. Both linear and circular polarization may be employed. For example, in semiconductor wafer inspection, linear polarization oriented at 45 degrees to the periodic structures on the semiconductor wafer can improve defect detection by reducing diffraction noise from these structures. After the light beam passes the adaptation optics, the light beam can enter the objective through a hole in the side of the mechanical assembly. A window (not shown) may be used to cover this hole and keep contamination from entering the objective. A window can also prevent any nitrogen purge gas from escaping. Once the laser beam enters the objective, light energy reflects off a prism 701 mounted in the region of the central obscuration 710 of the imaging system 400 as shown in FIG. 7. Prism 701 has a top surface 702 and a bottom surface 703. In the arrangement presented the prism 701 does not interfere with broad-band bright-field illumination or imaging. The prism reflects laser light energy and redirects the light energy along the optical axis of the imaging system at an angle normal to the surface 704. The prism 701 can be mounted to the plate 705 using optical contacting, epoxy or other adhesive, drilling a small recess in the plate, or other mechanical mounting procedure known to those skilled in the art. Mounting the prism to the plate 705 tends to reduce any ghost reflections from the top surface of the plate 705. The internal angle of the prism can be chosen so the light is totally internally reflected from the second surface 703, tending to eliminate the need for a mirror coating.

Figure 8:
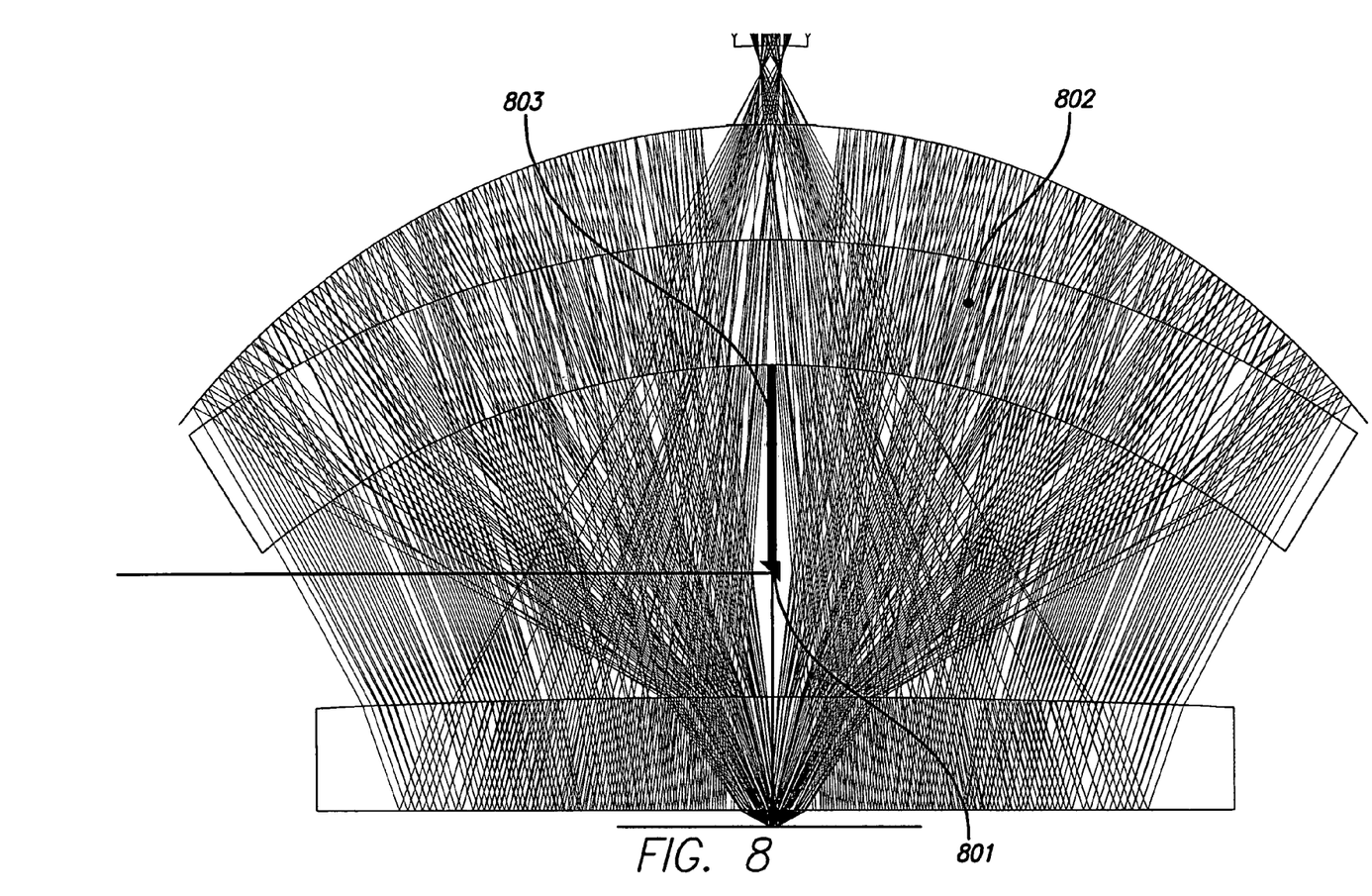
FIG. 8 shows a suspended mirror beam turning configuration located within the shadow of the central obscuration.
Figure 9:
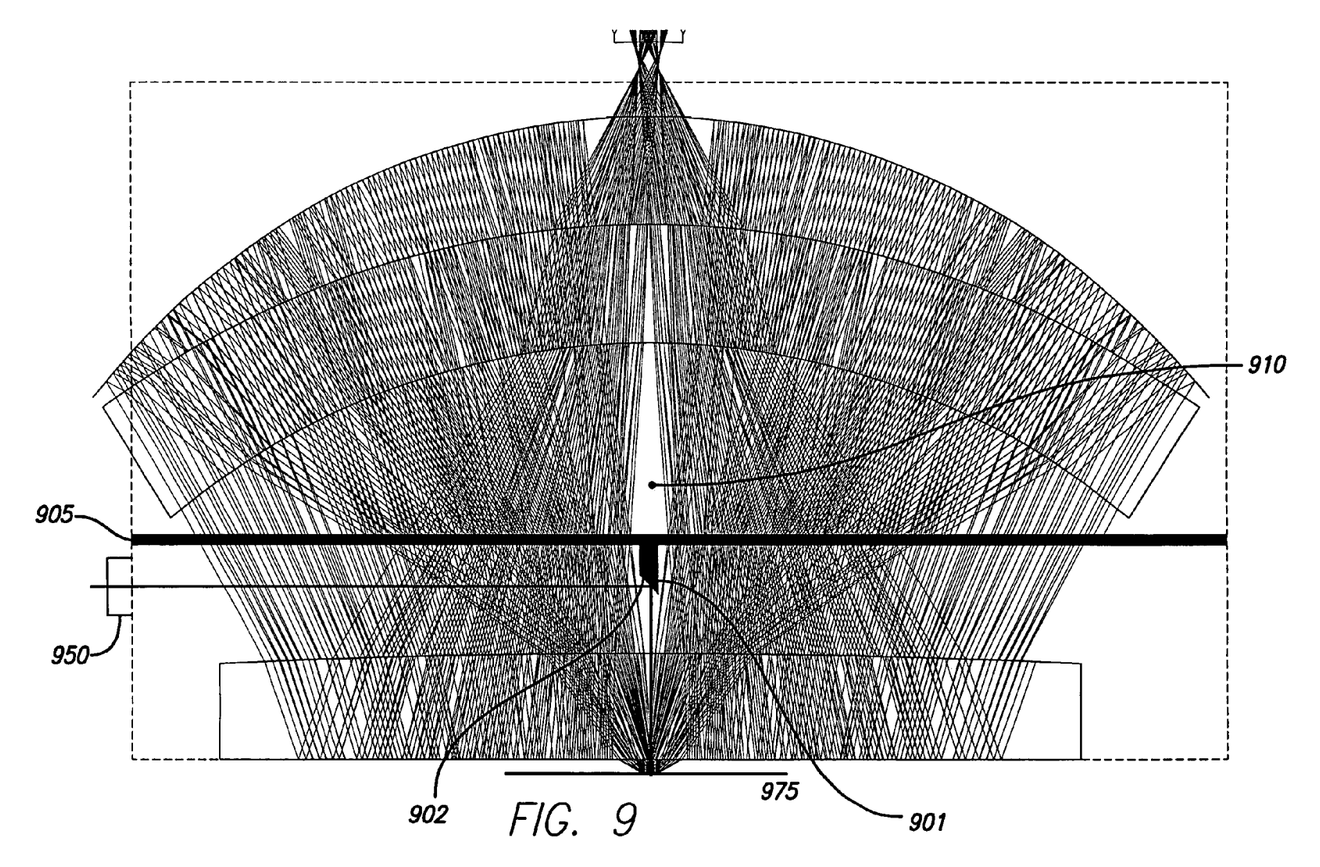
FIG. 9 is a suspended mirror beam turning configuration mounted on a transparent plate added to the imaging path.

A mirror may also be employed to direct the beam along the optical axis normal to the specimen or wafer. In an alternative embodiment, the mirror or prism 801 is attached to the meniscus lens 802 via a connector 803 as shown in FIG. 8. In yet another embodiment, the optical device 901, such as a prism or mirror, is suspended below the plate 905 in the central obscuration 910 by a "spider" 902 as shown in FIG. 9. The spider 902 generally enables firmly suspending the prism or mirror 901 below the plate and may include one, two or has three or more thin supports that have a minimal effect on the bright-field illumination and imaging. As shown in FIG. 9, dark-field light energy passes through window/aperture 950, strikes optical device 901 and is directed toward the surface 975 of the specimen or sample.

In normal incidence laser dark-field, limiting specular reflections, ghost reflections, and unwanted scattering light from the detector provide certain benefits. These effects are beneficial because the scattered and diffracted dark-field signal is generally much weaker than these noise sources. A prism delivery system such as that shown here eliminates the specular reflection from the surface as well as the ghost reflections because such reflections exit along the path of the illuminating beam. The primary noise source is from the scattering of the bottom surface of the plate 705. This scattering is relatively small and has no direct path to the sensor and thus presents minimal problems.

The scattering and diffracted light from the surface features is collected by the imaging system and mapped to the pupil plane. Each location in the pupil plane represents light collected at different scattering angles above the surface. Apertures can be placed at the pupil plane to select only the scattering angles of interest and improve the signal-to-noise ratio for the defect of interest. For example, the apertures shown in FIGS. 10A and 10B can limit scattered and diffracted light reaching the detector to the four quadrants of the pupil.

Figure 10A:
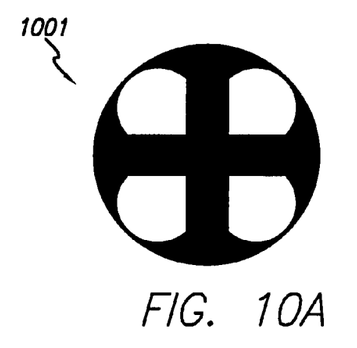
FIG. 10A presents a Fourier filter transmitting a fraction of each quadrant.
Figure 10B:
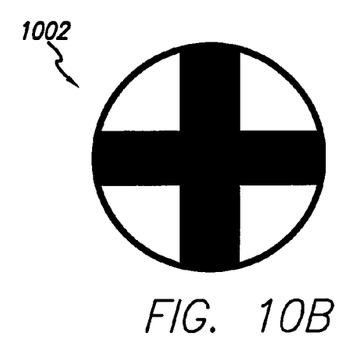
FIG. 10B is a further Fourier filter transmitting a different fraction of each quadrant.
Figure 10C:
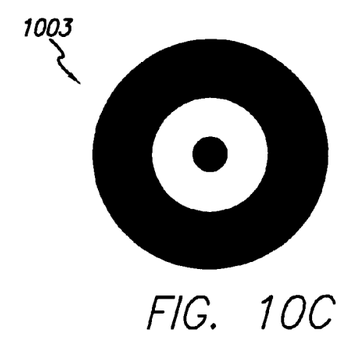
FIG. 10C is an additional Fourier filter transmitting a specific zone of numerical aperture from the available range.

The apertures of FIGS. 10A and 10B could be employed in semiconductor inspection. Light diffracted from the patterns on the wafer or reticle surface is primarily diffracted in the X and Y directions. This diffracted light is blocked by the aperture, such as aperture 1001 or 1002, allowing scattered light from any defects on the pattern to pass through to the detector. The aperture 1003 in FIG. 10C can limit the scattered and diffracted light reaching the detector to the central region of the pupil. Limiting light reaching the detector (not shown) can be useful for detecting microscratches on a semiconductor wafer.

Normal incidence laser dark field imaging has the advantage that Fourier filtering can be used to minimize repeating pattern signals on the surface and enhance the defect signal-to-noise ratio. Normal incidence laser dark-field generally provides a suitable Fourier filter design, known in the art and generally described in U.S. Pat. No. 6,020,957, "A SYSTEM AND METHOD FOR INSPECTING SEMICONDUCTOR WAFERS," inventors Eliezer Rosengaus and Steven R. Lange. The '957 patent is assigned to KLA-Tencor Corporation and is incorporated herein by reference.

A Time Delay and Integration (TDI) sensor or detector, not shown but may be positioned, for example, at point 420 in FIG. 4, may be used to detect the broad-band bright-field and normal incidence laser dark-field signals. Use in such a system can require a sensor with high sensitivity for the bright-field signal and high dynamic range for the dark-field signal. The bright-field and dark-field signals may be detected separately or combined together on the sensor. Alternatively, the bright-field and dark-field signals may be separated and sent to separate TDI sensors.

The present system design may be employed in various environments, including but not limited to lithography, microscopy, biological inspection, medical research, and the like.

The design presented herein and the specific aspects illustrated are meant not to be limiting, but may include alternate components while still incorporating the teachings and benefits of the invention, namely a beam delivery system for laser dark-field illumination in a catadioptric optical system. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. An apparatus for inspecting a specimen, comprising:
   a catadioptric objective exhibiting a central obscuration that receives light energy from a primary illumination source and delivers light energy toward the specimen; and
   an optical reflector-completely positioned within the central obscuration, between the catadioptric objective and the specimen, the optical reflector configured to deflect further illumination received from a secondary illumination source and divert the further illumination at near normal incidence to the specimen.

2. The apparatus of claim 1, further comprising a detector arrangement sensitive to a wavelength of illumination from the secondary illumination source.

3. The apparatus of claim 1 where the central obscuration is less than approximately 15% of a pupil diameter of the catadioptric objective.

4. The apparatus of claim 1 where the optical device comprises a prism.

5. The apparatus of claim 2 where the detector arrangement comprises a plurality of detectors.

6. The apparatus of claim 1 where the primary illumination source comprises an arc lamp.

7. The apparatus of claim 1 where the secondary illumination source wavelength comprises at least one wavelength from a group comprising 193, 198, 213, 244, 257, 266, 363.8, 354, 351, 355, 325, and 532 nm.

8. The apparatus of claim 2 wherein the detector arrangement comprises at least one Time Delay and Integration sensor.

9. The apparatus of claim 1, further comprising an optical Fourier filter aperture located at a pupil plane of the apparatus, and wherein the optical Fourier filter aperture attenuates repeating pattern signals received from the specimen.

10. The apparatus of claim 9, where the optical Fourier filter aperture comprises a spectrally narrow-band dielectric thin film pattern, wherein the spectrally narrow-band dielectric thin film pattern blocks components of the further illumination from the secondary illumination source while substantially transmitting the illumination from the primary illumination source.

11. A method of inspecting a specimen, comprising:
   illuminating a surface of the specimen using a primary illumination source and an objective having central obscuration; and
   illuminating the surface using a secondary illumination source, said illuminating by the secondary illumination source occurring at a substantially normal angle of incidence using a reflective surface completely positioned within the central obscuration between the objective and the specimen.

12. The method of claim 11, wherein the primary illumination source is broad-band and the secondary illumination source is narrow-band.

13. The method of claim 11, wherein the illuminating by the primary illumination source occurs contemporaneously with the illuminating by the secondary illumination source.

14. The method of claim 11, wherein the illuminating by the primary illumination source occurs at a time different from the illuminating by the secondary illumination source.

15. A method of inspecting a specimen, comprising:
illuminating a surface of the specimen using a primary illumination source configured to transmit light energy through an objective having central obscuration; and
illuminating the surface of the specimen using a secondary illumination source, said illuminating using the secondary illumination source occurring at a substantially normal angle of incidence to the surface using a reflective surface completely positioned within the central obscuration and between the objective and the specimen.

16. The method of claim 15, wherein the primary illumination source is broad-band and the secondary illumination source is narrow-band.

17. The method of claim 15, wherein the illuminating by the primary illumination source occurs contemporaneously with the illuminating by the secondary illumination source.

18. The method of claim 15, wherein the illuminating by the primary illumination source occurs at a time different from the illuminating by the secondary illumination source.

* * * * *